INVENTORS.
Bohumil Stádník
BY Zdeněk Tronner

INVENTORS.
Bohumil Stádník
BY Zdeněk Tronner

United States Patent Office 3,541,300
Patented Nov. 17, 1970

3,541,300
APPARATUS FOR STABILIZING THE MODULATION OF COHERENT RADIATION
Bohumil Stádník and Zdeněk Tronner, Prague, Czechoslovakia, assignors to Ceskoslovenska akademie ved, Prague, Czechoslovakia
Filed Aug. 1, 1968, Ser. No. 749,467
Claims priority, application Czechoslovakia, Dec. 18, 1967, 8,943/67
Int. Cl. A01s 3/02; A01u 7/00; A05b 3/00
U.S. Cl. 219—210
9 Claims

ABSTRACT OF THE DISCLOSURE

The electromagnetically active optical component of a device for modulating coherent radiation over a range from infrared to ultraviolet is encased in a heating casing. A heating winding around the outside of the heating casing is energized under the control of a temperature sensitive winding which is wound on the heating casing between the heating casing and the heating winding to stabilize the environment of the optical component thereby stabilizing the modulation of the radiation. The optical component is positioned in a metal holder. A heating casing surrounds and is in thermal contact with the metal holder. The sensitive and heating windings are wound around the heating casing. A first layer of thermal insulating material surrounds the heating casing and the windings. A metal inner cover casing surrounds the first layer and has polished heat-reflecting inside and outside surfaces and bases with axially centered radiation permeable windows therein. A second layer of thermal insulating material surrounds the major part of the cylindrical surface of the inner cover casing. A metal outer cover surrounds the second layer.

DESCRIPTION OF THE INVENTION

The present invention relates to apparatus for stabilizing the modulation of coherent radiation. More particularly, the invention relates to apparatus for stabilizing the modulation of coherent radiation over a range from infrared to ultraviolet by thermal stabilization of the environment of electromagnetically active optical means of a device for modulating such coherent radiation.

Existing known methods of modulation of a particularly coherent radiation in the region from infrared to ultraviolet do not secure stable modulation, or a modulation of the radiation independent to the highest degree of changes of the ambient temperature in which the device for carrying out the respective method of modulation is located. The reason for instability of known methods of modulation and of stabilizing apparatus is due to the fact that the electromagnetically, electrically and/or magnetically active optical elements utilized such as, for example, crystal cuts, are not at all temperature stabilized, or are insufficiently thermally stabilized. Since the value of the refractive index of the material from which the electromagnetically, electrically and/or magnetically active optical elements are made depends on temperature, the amount of the fundamental phase shift of the electromagnetically, electrically and/or magnetically active elements such as, for example, diagonal crystal cuts, depends upon temperature. The temperature dependence and the instability of the modulation and of the modulating device resulting from the first type of instability appear in all electromagnetically, electrically and/or magnetically active optical elements which have a fundamental phase shift of the radiation. The temperature dependence is thus not only evident in modulation devices, but also in other devices such as, for example, deflectors, optical shutters, and the like.

The temperature dependence of the value of the refractive index and of the amounts of the phase shift are very high in materials of which electromagnetically, electrically and/or magnetically active optical elements are comprised in devices for modulating radiation such as, for example, laser devices. The temperature dependence is so great that in normal operation, that is without stabilization of the ambient temperature, the amplitude of the modulation radiation varies to such an extent that satisfactory modulation transmission is impossible for practical purposes.

Changes of the optical properties of materials due to changes of the ambient temperature, and consequently also due to changes of the temperature of electromagnetically, electrically and/or magnetically active optical elements, are accompanied by mechanical changes in such elements. The mechanical changes may comprise, for example, heat elongation, and contribute to the instability of radiation modulation. In order to remove undesirable changes in the optical properties of electromagnetically, electrically and/or magnetically active optical elements, or materials from which such elements are produced, it is therefore necessary to thermally stabilize the environment or surroundings of such elements to the extent where temperature variations are never greater than 0.01° C.

Known systems for producing stable modulation of a particularly coherent radiation and for stabilizing modulating devices for producing such modulation are varied. A first system for producing stable radiation modulation is based on passive temperature isolation of the functional modulating elements which are positioned inside an envelope which is insensitive to temperature. Due to physical laws, particularly a final and non-zero value of the coefficient of thermal conductivity of all materials, and therefore also of the material of which the temperature-insensitive envelope is made, heat conduction must occur between the space inside said envelope and the outer surroundings of said envelope. This prevents the temperature inside the envelope from being maintained at a specific stable value with any degree of accuracy for an extended period of time. It is therefore impossible to utilize the first system for stable and continuous modulation over a wide range of ambient temperature.

A second system for producing stable modulation of a particularly coherent radiation is based on the use of temperature balance between the liquid and solid state of suitable materials. An active material with suitable physical and chemical properties is placed around a stabilized space and maintained at its melting point, so that part of said active material is in the liquid state and part is in the solid state. When the system of the two states of material is maintained under constant pressure, the temperature is constant. Heat conduction increases the amount of material in the solid state and thereby varies the volume ratio of the two states of the material.

Apparatus for the second system of temperature stabilization is so designed that the decrease of the volume of material in the liquid state results in closing a circuit and energizing a heating device. This causes the reconstitution of the original parts of the liquid and solid states of the material. By repetition of the process, temperature stability is provided in the space in which a stable temperature is desired. This system has been utilized, for example, in stabilizing the operation of radio frequency oscillators and it may have been utilized for light modulators also. The modulator is designed for firm incorporation in laser apparatus and there is no provision for independent adjustment of optimum operational parameters.

The second system is not susceptible to realization with conventional technology, because it is exacting in its requirement for high chemical purity of suitable materials used for producing a state of thermal balance. The second system does not provide stable modulation in a wide range of ambient temperatures, and the stabilization temperature is rather high without the utilization of additional materials. Furthermore, the apparatus is complicated and technologically exacting with regard to the processes, the material utilized and the accuracy of production of structural components and their mechanical and electrical reliability and functions. The second system also creates further difficulties during the passage of radiation.

Other systems for modulating radiation do not require temperature stabilization. The advantage of such systems is their simple structure. However, they also have a number of drawbacks which limit their useful range. Their principal disadvantage is a relatively high required modulating voltage for one modulation element, such modulating voltage being in the order of thousands of volts. Another disadvantage is the presence of irremovable piezoelectric resonances which limit to a great extent the transmission of the frequency band. Thus, when several modulation elements are utilized, an increase necessarily occurs in the radiation losses in consequence of absorption, reflection and dispersion. Another disadvantage of such systems is a difficulty in providing contacting and electrical connection of the individual elements. This leads to contact resistances between the elements and to undesirable changes in the modulation signal. Such systems are thus rarely utilized.

The principal object of the present invention is to provide new and improved apparatus for stabilizing the modulation of coherent radiation.

An object of the present invention is to provide new and improved apparatus for stabilizing the modulation of coherent radiation over a range from infrared to ultraviolet by thermal stabilization of the environment of electromagnetically active optical components of a device for producing such coherent radiation.

An object of the present invention is to provide a wide practical field of use for electromagnetically, electrically and/or magnetically active optical components such as, for example, diagonally cut crystals for processing light rays or radiation. The field of use includes surveying, earth and cosmic navigation, seismographic and dosimetric instrumentation and instruments and apparatus for controlled machining, medicine, communications and all applications requiring uninterrupted stable operation of light modulating devices over a long period of time.

An object of the present invention is to eliminate most of the drawbacks and disadvantages of the known systems, particularly the elimination of the consequences of nonexistence of an ideal thermal insulator, the elimination of the impossibility of independently adjusting optimal operation parameters, the elimination of the necessity of utilizing other than currently utilized technological processes in utilizing the known systems, the elimination of the necessity for high chemical and optical purity, or for homogeneity of materials used for producing a state of thermal balance, the elimination of narrow limits of ambient temperature changes to achieve stable modulation, the elimination of high stabilization temperatures or the need for additional materials, the elimination of the need for great accuracy in the production of structural components, the elimination of the need for relatively high modulating voltage of the order of thousands of volts, the elimination of piezoelectric resonances which limit the transmitted frequency band, and the elimination of radiation losses by absorption, reflection and dispersion, and the like.

An object of the present invention is to provide uninterrupted stable modulation of radiation, particularly of coherent radiation, and to provide such modulation for a long period of time.

An object of the present invention is to provide stable modulating of coherent radiation with a low modulation voltage of the order of volts or, at most, tens of volts, and with radiation losses by absorption, dispersion and reflection reduced to a minimum.

An object of the present invention is to provide apparatus for stabilizing the modulation of coherent radiation, which apparatus is of simple structure and does not require special production technology, accuracy of machining of the components, chemical purity, optical homogeneity or special physical properties of the materials utilized, and utilizes normal raw materials and components.

An object of the present invention is to provide modulation stabilization at one stabilized temperature and to thereby provide maximum loss-free operation of electromagnetically, electrically and/or magnetically active elements over a wide range of operational temperatures, in the order of tens of degrees centigrade.

An object of the present invention is to position additional optical elements such as, for example, a quarter wave plate and a polarizer, inside a thermally stabilized space and to design such optical elements for one stabilized temperature.

Another object of the present invention is to arrange the apparatus in such a manner that it is adjustable independently of the structure of the radiation source, which may comprise, for example, a laser, and thus permit optimum adjustment of operational parameters.

The apparatus and method of the present invention provide high stability of the functional properties, and therefore also high operational reliability, and permit uninterrupted operation over a long period of time, or even permanently. The structure of the modulation apparatus is relatively simple and such apparatus may be produced by normal production technology without unusual requirements for the properties of the materials utilized or for the accuracy of machining of the components.

The apparatus and method of the present invention utilize advantageous electro-optical properties of electromagnetically, electrically and/or magnetically active optical elements which, under otherwise normal conditions, have a functional instability due to the dependence of the optical properties on temperature.

The thermal stability provided by the apparatus of the present invention is to an extent better than $\pm 0.01$ degree centigrade.

In accordance with the present invention, apparatus for stabilizing the modulation of coherent radiation over a range from infrared to ultraviolet by thermal stabilization of the environment of electromagnetically active optical means of a device for producing such coherent radiation comprises a heating casing encasing the electromagnetically active optical means of the device. Heating apparatus comprises a heating winding around the outside of the heating casing and an electrical energizing device electrically connected to the heating winding for energizing the heating winding to heat the heating casing. A heating control comprises a temperature sensor interposed between the outside of the heating casing and the heating winding and in thermal contact with each. An electrical switch interposed in the electrical connections between the electrical energizing device and the heating winding controls the supply of electrical energy from the electrical energizing device to the heating winding. An electrical control electrically connected between the temperature sensor and the electrical switch controls the switch to deenergize the heating winding upon the sensing by the temperature sensor of a first predetermined adjusted temperature and to energize the heating winding upon the sensing by the temperature sensor of a second predetermined adjusted temperature. The temperature sensor comprises a sensing winding around the outside of the heating casing and in thermal contact with the heating casing and the heating winding. The sensing winding has an electrical resistance which varies in magnitude with temperature. The electrical control comprises an electrical resistance bridge having a plurality of bridge arms, one of which comprises the sensing winding.

The device comprises a metal holder and a heating casing of open substantially cylindrical configuration surrounding and in thermal contact with the metal holder. A first layer of thermal insulating material surrounds the heating casing and the heating winding therearound. A metal inner cover casing of closed substantially cylindrical configuration surrounds the first layer and has polished heat-reflecting inside and outside surfaces and bases having axially centered radiation permeable windows therein. A second layer of thermal insulating material surrounds the major part of the substantially cylindrical surface of the inner cover casing and an outer metal cover surrounds the second layer.

The sensing winding is wound in close contact with the outer surface of the heating casing and the heating winding is wound in close contact with the sensing winding. A quarter wave plate is mounted in and encloses one open base end of the heating casing. A polarizer is mounted in and encloses the other open base end of the heating casing. Electrodes contact the electromagnetically active optical means of the device in the metal cover and an electrical energizing device electrically connected to the electrodes energizes the electrodes.

In accordance with the present invention, a method of stabilizing the modulation of coherent radiation over a range from infrared to ultraviolet by thermal stabilization of the environment of electromagnetically active optical means of a device for modulating such coherent radiation comprises the steps of encasing the electromagnetically active optical means of the device in a holder, electrically heating the holder, and controlling the heating of the holder by electrically sensing the temperature of the holder and electrically controlling the electrical heating of the holder by controlling the supply of electrical heating energy in accordance with the sensed temperature. The holder is enclosed and surrounded in thermal contact with a heating casing of open substantially cylindrical configuration. The heating casing is surrounded with thermal insulating material. The heating casing is heated with a heating winding around the heating casing. The thermal insulating material is surrounded with a substantially cylindrical metal inner cover casing having polished heat reflecting inside and outside surface. The major part of the substantially cylindrical surface of the inner cover casing is surrounded with additional thermal insulation. The additional thermal insulation is surrounded with a metal outer cover.

In order that the present invention may be readily carried into effect, it will now be described with reference to the accompanying drawings, wherein.

Figure 1:
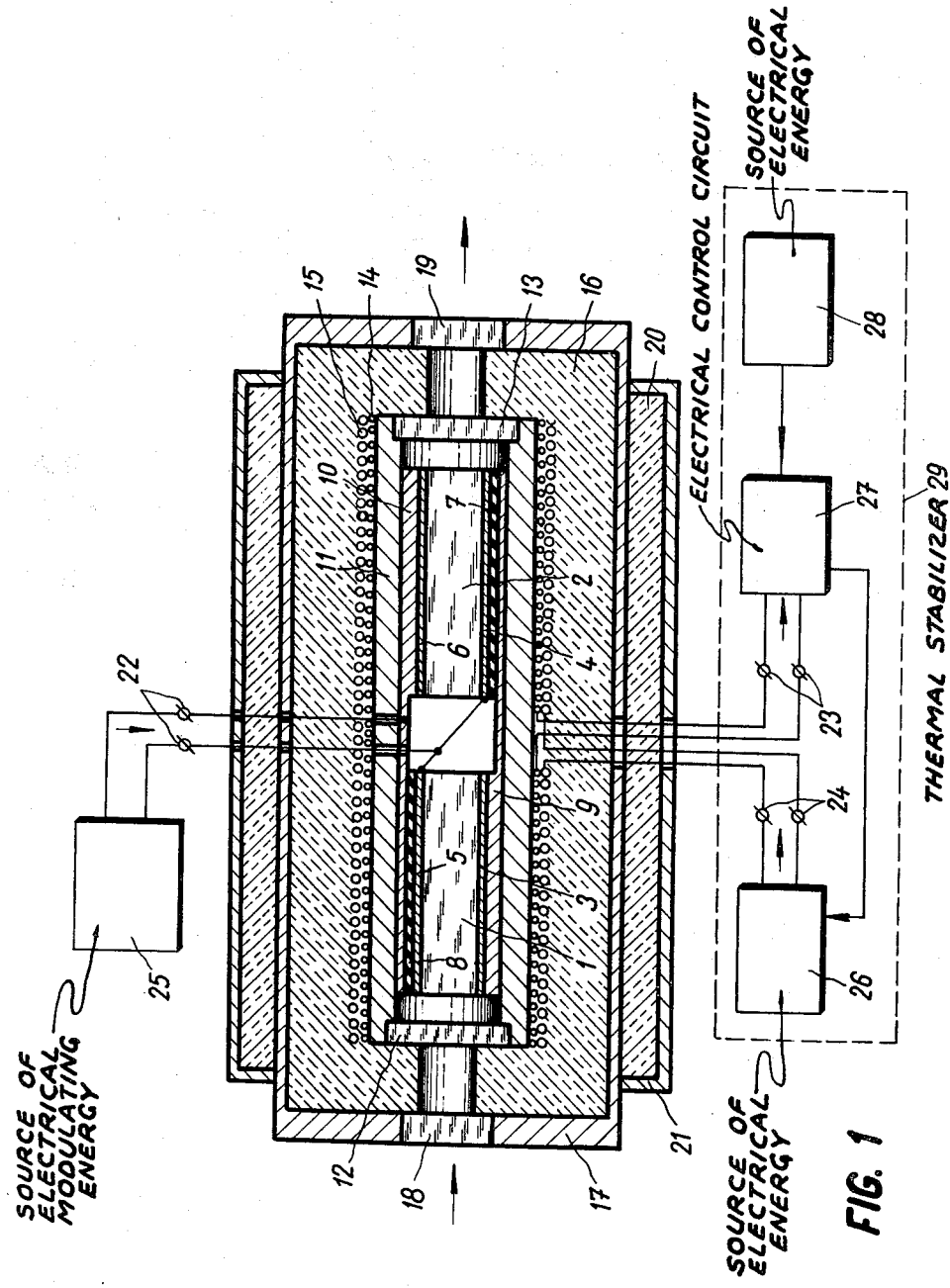
FIG. 1 is a view, partly in section, of an embodiment of the apparatus of the present invention for stabilizing the modulation of coherent radiation.
Figure 2:
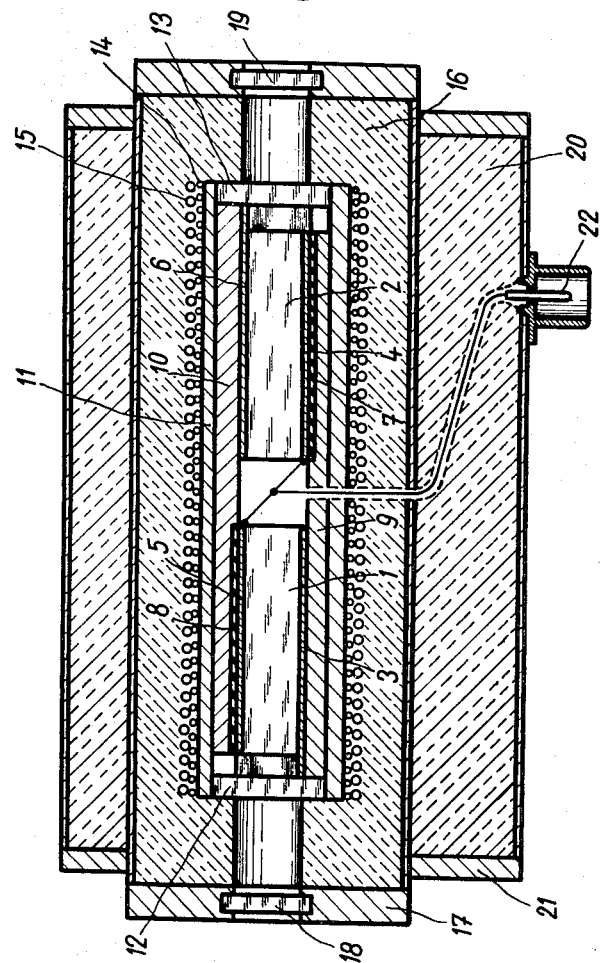
FIG. 2 is a view, partly in longitudinal section, of the housing part of the embodiment of FIG. 1.

In FIGS. 1 and 2, an electromagnetically, electrically and/or magnetically active optical element 1 has two electrodes 3 and 5 and an electromagnetically, electrically and/or magnetically active optical element 2 has two electrodes 4 and 6. The optical elements 1 and 2 are positioned in an affixed to a metal holder 9, 10 via electrical insulation 7 and 8.

The metal holder 9, 10 comprises two parts and is surrounded by, and in thermal contact with a heating casing 11 of open cylindrical configuration. A quarter wave plate 12 is mounted in and encloses one open base end of the heating casing 11. A polarizer 13 is mounted in and encloses the other open base end of the heating casing 11.

The metal holder 9, 10 comprises two longitudinally extending parts 9 and 10 in order to facilitate the assembly of the apparatus. The cross-section of the area enclosed by the metal holder 9, 10 corresponds to the axial section of each of the optical elements 1 and 2. The parts 9 and 10 of the holder 9, 10 are electrically conductive and are electrically connected and are mechanically removably joined to each other. Each of the electrically and/or magnetically active optical elements 1 and 2 is preferably a quadrangular prism whose two opposite longitudinal walls are conductively metallized in accordance with the optical orientation of the material of the prism so that the electrodes 3 and 5 and 4 and 6 are provided.

In accordance with the type of electromagnetically, electrically and/or magnetically active elements utilized, one or several prisms are provided in the metal holder. If the electromagnetically, electrically and/or magnetically active optical elements constitute a prism produced by a diagonal crystal cut Z—45, at least one such prism is positioned in the metal holder 9, 10. If the electromagnetically, electrically and/or magnetically active optical elements constitute a prism produced by a crystal cut Y—45, at least two such prisms are positioned in the metal holder 9, 10. If at least one element comprising a prism produced by a crystal cut Z—45 is positioned in the metal holder 9, 10, the first electrode of the element is in direct electrically and thermally conductive connection with the corresponding wall of said metal holder, the second electrode of said element is insulated from said metal holder and the electrically conductive supply lead to the second electrode is connected to a first terminal of the modulation source and the second terminal of said modulation source is connected to said metal holder.

If at least two elements of a prism produced by a crystal cut Y—45, or an integral number of pairs of such elements are positioned in the metal holder 9, 10, with one pair of the elements always functioning as one modulation unit, then the first electrode of the first element is in direct thermally and electrically conductive connection with the first corresponding wall of said metal holder and the second electrode of the second element is in direct thermally and electrically conductive connection with the opposite wall of said metal holder. The second electrode of the first element is connected to the first electrode of the second element and to the first terminal for connecting the supply lead of the modulation source. The pairs of prisms or elements are interconnected in parallel. If elements comprising a prism produced by a crystal cut Z—45 are utilized, all the elements are interconnected in parallel and may be provided in either an even or odd number.

Helical grooves are provided in the cylindrical surface of the heating casing 11. A temperature sensitive winding, or thermal or temperature sensor 14, is wound around the outside of the heating casing 11 and is placed in the helical grooves. The temperature sensitive winding 14 comprises any suitable electrical temperature sensitive or temperature responsive material such as, for example, electrically insulated thin copper wire. The temperature sensitive winding 14 is in thermal contact with the heating casing 11.

A heating winding 15 is wound around the outside of the heating casing 11. The heating winding 15 is placed on and in thermal contact with the temperature sensitive winding 14. The heating winding 15 comprises any suitable electrical heating material such as, for example, electrically insulated resistance wire.

A first layer 16 of thermal insulating material surrounds the heating casing 11 and the windings 14 and 15 around said heating casing. A metal inner cover casing 17 of closed cylindrical configuration surrounds the first layer 16 of thermal insulation. The inner cover casing 17 has highly polished heat-reflecting inside and outside surfaces. The bases of the inner cover casing 17 have axially centered, apertures formed therethrough with radiation permeable windows 18 and 19 provided therein.

A second layer 20 of thermal insulating material surrounds the major part of the cylindrical surface of the inner cover casing 17. A metal outer cover 21 covers the second layer 20. The outer cover 21 comprises, for example, metal and has a polished surface.

A source 25 of electrical modulating energy is electrically connected to the leads of the electrodes 3 and 6 and 4 and 5 of the elements 1 and 2 via terminals 22 (FIG. 1). A source 26 of electrical energy for heating the heating casing 11 is electrically connected to terminals 24 of the heating winding 15. An electrical control circuit 27 is electrically connected to terminals 23 of the temperature sensitive winding 14 (FIG. 1).

A source 28 of electrical energy is electrically connected to the temperature sensitive winding 14 via the electrical control circuit 27. The components 26, 27 and 28 function as a thermal stabilizer 29 (FIG. 1). The source 28 is connected to an input of the control circuit 27. An output of the control circuit 27 is connected to the input of the source 26 of electrical energy which heats the heating casing 11 by energizing the heating winding 15. The source 28 energizes, for example, a second diagonal branch of an electrical bridge circuit having a first diagonal in which an electrical switch such as, for example, a relay is connected. The switch controls the connection and disconnection of the source 26 of the electrical energy and the heating winding 15 and thereby controls the supply of electrical energy to said heating winding (not shown in the figures).

Figure 3:
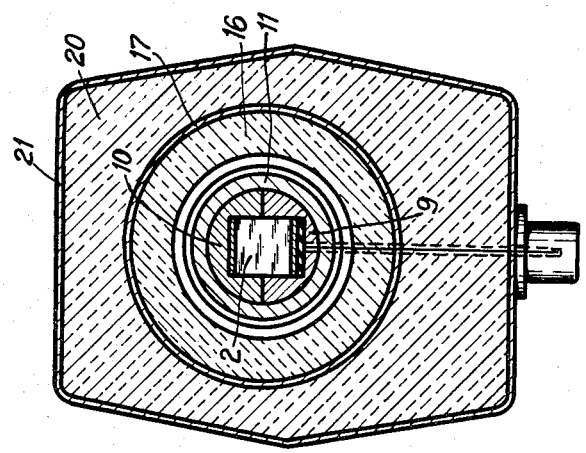
FIG. 3 is a view, partly in axial section, of the housing part of the embodiment of FIG. 1.

FIGS. 2 and 3 disclose the housing part of the apparatus of FIG. 1 for stabilizing the modulation of preferably coherent radiation. In FIGS. 2 and 3, a coaxial connector 22 functions as the terminals 22 of the source 25 of modulating energy of FIG. 1.

The new and useful results attained by the apparatus of the present invention are due to the location of the electrically and/or magnetically active optical elements in the metal holder 9, 10 inside the heating casing 11. This permits the stabilization of the ambient temperature and, thus, also permits the stabilization of the temperature of the optical elements. The temperature stabilization is automatic and is controlled by a control circuit which depends upon the temperature sensitivity of the temperature sensor 14. The temperature sensitive winding 14 is in the closest possible thermal contact with the heating casing 11 and therefore provides the most accurate control by the electrical control circuit 27. This enables the undesirable effect of thermal inertia to be readily overcome and reduces the time constant of the control circuit 27 to a minimum, and said control circuit thereby attains maximum thermal sensitivity.

In accordance with other circumstances which effect the thermal sensitivity, or the rate of regulation such as, for example, the dimensions of the electrically and/or magnetically active optical elements, the material of such elements, the type of cut of such elements, etc., it is possible to provide a thermal sensitivity of the temperature sensitive winding 14 in the order of hundredths of a degree centigrade. Under certain circumstances, it is possible to provide control to about 0.01° C. Since the electrically and/or magnetically active optical elements are temperature stabilized to the same extent as the temperature stabilization of the heating casing 11, their optical properties, particularly the refractive index and phase shift, are stable to an extent corresponding to the stability of the temperature of the elements. Therefore, the modulation process, its effect, and the effect of the apparatus of the present invention are stable to the extent of the temperature stability of the heating casing and of the optical elements. Such optical elements are not only the electrically and/or magnetically active optical elements, but also the purely optical elements such as the quarter wave plate 12 and the polarizer 13. The optical elements 12 and 13 are also thermally stabilized.

Although not shown in the figures, the electrical control circuit 27 may comprise an electrical bridge circuit comprising four resistors, one branch comprising the temperature sensitive winding 14. The remaining three branches may be maintained at a constant temperature to prevent variation in their electrical resistance values. After the thermal stabilizer 29 is connected to the electrical leads from the windings 14 and 15, the space inside the heating casing 11 is heated to a specific temperature which is determined by the relative values of the bridge circuit. During heating of the heating casing 11, the electrical resistance of the temperature sensitive winding 14 gradually increases until it reaches the resistance value of the adjacent bridge branch. At that instant, the bridge is at balance and the voltage of the first diagonal of said bridge drops to zero. This causes the electrical switch, which may, for example, be a relay, to disconnect the source 26 of electrical energy from the heating winding 15. The temperature of the heating casing 11 then slowly decreases.

A variation in the temperature of the heating winding, or cooling of said heating winding, cools the temperature sensitive winding 14. As soon as the variation in temperature reaches a hundredth of a degree centigrade, imbalance in the bridge produces a current in the first diagonal thereof. The current flows through the switching relay winding and said relay connects the source 26 of electrical energy to the heating winding 15. The temperature of the heating casing 11 then begins to increase, and the entire process is repeated.

The desirable effects of the apparatus of the present invention are supported by the structure of said apparatus for the electrically and/or magnetically active optical elements and the purely optical elements. Heat radiation into the environment of such elements 1, 2, 12 and 13 is suppressed to the greatest extent by suitable thermal isolation provided by the aforedescribed housing parts. This permits stabilization of the operation or the modulation process and of the product over a wide range of variations in the ambient temperature and over a long period of time. These variations may range over tens of degrees centigrade. The attained temperature stabilization is highly effective, because changes in the ambient temperature are prevented from penetrating to the environment of the optical elements, and heat loss from the heating casing 11 to the surrounding atmosphere is simultaneously prevented.

The utilization of so-called "lambda-plate" windows to close the thermally insulated inner area of the housing, reduces losses by reflection of the modulated radiation passing through. The stabilized modulation of coherent radiation provided by the apparatus of the present invention is reliable, without disturbance, and without distortion over a wide range of temperature variations.

The apparatus of the present invention also stabilizes the optical and mechanical properties of the materials at a specific stable operational temperature. The stable operational temperature of the apparatus provides optimum action of the electrically and/or magnetically active optical elements. The heating of the space inside the heating casing 11 considerably reduces the humidity of the surroundings, so that chemical changes, and particularly destructive changes on the surface of the polished surfaces of the active optical elements, are prevented.

The present invention makes possible a wider use of crystal materials displaying the electro-optical phenomenon in modulation techniques, in electrical circuits and in devices for measuring dichroidal phenomena. The present invention also widens the practical applications of sources of coherent light radiation or lasers and thereby increases their technical and economical value.

The temperature stabilization provided by the present invention provides stabilization of the operation of electro-optical modulators over a long period of time and over wide ranges of the ambient temperature. The modulators may be used for various purposes, as indicated, and the method of temperature stabilization may also be used with other electro-optical instruments.

A functionally stable device is an essential part of laser devices and in the transmission and recording of information about coherent radiation. The increasing use of laser techniques will also lead to an increase of stable radiation modulators and of other applications of crystal cuts providing an electro-optic phenomenon. A primary increase will occur in measuring techniques such as, for example, in measuring devices of circular dichroism, in meteorology, in measuring the range of vision and the height of clouds, in the accurate measuring of distance in surveying, and in measuring shock waves or surges. Radiation modulators with thermal stabilization will be fully utilized in communication and navigational systems where perfect radiation modulators are essential.

While the invention has been described by means of a specific example and in a specific embodiment, we do not wish to be limited thereto, for obvious modifications will occur to those skilled in the art without departing from the spirit and scope of the invention.

What we claim is:

1. Apparatus for stabilizing the modulation of coherent radiation over a range from infrared to ultraviolet by thermal stabilization of the environment of electromagnetically active optical means of a device for producing such coherent radiation, said apparatus comprising:
    casing means encasing the electromagnetically active optical means of said device;
    heating means comprising a heating winding around the outside of said casing means and electrical energizing means electrically connected to said heating winding for energizing said heating winding to heat said casing means; and
    heating control means comprising temperature sensitive means wound about the outside of said casing means and the inside of said heating winding and in thermal contact with each, electrical switch means interposed in the electrical connections between said electrical energizing means and said heating winding for controlling the supply of electrical energy from said electrical energizing means to said heating winding, and electrical control means electrically connected between said temperature sensitive means and said electrical switch means for controlling said switch means to deenergize said heating winding upon the sensing by said temperature sensitive means of a first predetermined adjusted temperature and to energize said heating winding upon the sensing by said temperature sensitive means of a second predetermined adjusted temperature.

2. Apparatus as claimed in claim 1, wherein said temperature sensitive means comprises a sensing winding around the outside of said casing means and in thermal contact with said casing means and said heating winding, said sensing winding having an electrical resistance which varies in magnitude with temperature, and said electrical control means comprising an electrical resistance bridge having a plurality of bridge arms, one of which comprises said sensing winding.

3. Apparatus as claimed in claim 2, wherein said housing means comprises a metal holder and a heating casing of open substantially cylindrical configuration surrounding and in thrmal contact with said metal holder, and further comprising a first layer of thermal insulating material surrounding said housing means and the heating winding therearound, a metal inner cover casing of closed substantially cylindrical configuration surrounding said first layer and having polished heat-reflecting inside and outside surfaces and bases having axially centered radiation permeable windows therein, a second layer of thermal insulating material surrounding the major part of the substantially cylindrical surface of said inner cover casing and a metal outer cover surrounding said second layer.

4. Apparatus as claimed in claim 3, wherein said sensing winding is wound in close contact with the outer surface of said heating casing and said heating winding is wound in close contact with said sensing winding.

5. Apparatus as claimed in claim 4, further comprising a quarter wave plate mounted in and enclosing one open base end of said heating casing.

6. Apparatus as claimed in claim 5, further comprising a polarizer mounted in and enclosing the other open base end of said heating casing.

7. Apparatus as claimed in claim 6, further comprising electrode means contacting the electromagnetically active optical means of said device in said housing means and electrical energizing means electrically connected to said electrode means for energizing said electrode means.

8. A method of stabilizing the modulation of coherent radiation over a range from infrared to ultraviolet by thermal stabilization of the environment of electromagnetically active optical means of a device for modulating such coherent radiation, said method comprising the steps of:
    encasing the electromagnetically active optical means of the device in a metal holder;
    surrounding the metal holder with an electrical heater for electrically heating the metal holder; and
    controlling the heating of the metal holder by interposing an electrical sensor winding between said heater and about said holder for sensing the temperature of the surface of the metal holder and electrically controlling the electrical heating of the metal holder by controlling the supply of electrical heating energy in accordance with the sensed temperature.

9. A method as claimed in claim 8, further comprising the steps of enclosing and surrounding the metal holder in thermal contact with a heating casing of open substantially cylindrical configuration, surrounding the metal holder with thermal insulating material, heating the metal holder with a heating winding around the thermal insulating material, surrounding the thermal insulating material with a substantially cylindrical metal cover casing having polished heat-reflecting inside and outside surfaces, surrounding the major part of the substantially cylindrical surface of the inner cover casing with additional thermal insulation, and surrounding the additional thermal insulation with a metal outer cover.

References Cited

UNITED STATES PATENTS

| | | | |
|---|---|---|---|
| 3,299,300 | 1/1967 | Read et al. | 310—8.9 |
| 3,324,295 | 6/1967 | Harris | 332—7.51 |
| 3,431,418 | 3/1969 | Stone | 332—7.51 |

FOREIGN PATENTS

| | | |
|---|---|---|
| 1,415,075 | 9/1965 | France. |

JOSEPH V. TRUHE, Primary Examiner

P. W. GOWDEY, Assistant Examiner

U.S. Cl. X.R.

310—8.9; 331—94.5; 356—112